United States Patent

Vielhauer

[15] 3,695,253
[45] Oct. 3, 1972

[54] APPARATUS FOR PHYSIOLOGICAL INVESTIGATION

[72] Inventor: Harold G. Vielhauer, 1359 Fudge Drive, Xenia, Ohio 45385

[22] Filed: June 29, 1970

[21] Appl. No.: 50,542

Related U.S. Application Data

[63] Continuation of Ser. No. 586,117, Oct. 12, 1966, abandoned.

[52] U.S. Cl..............................128/2.05 P
[51] Int. Cl. ................................A61b 5/02
[58] Field of Search......128/2 R, 2 S, 2.05 A, 2.05 B, 128/2.05 D, 2.05 E, 2.05 F, 2.05 G, 2.05 M, 2.05 N, 2.05 P, 2.05 Q, 2.05 R, 2.05 S, 2.05 T, 2.05 V

[56] References Cited

UNITED STATES PATENTS

| | | | |
|---|---|---|---|
| 3,405,288 | 10/1968 | Dittrich | 128/2.05 P |
| 3,076,452 | 2/1963 | Rothe | 128/2.05 B |
| 3,187,098 | 6/1965 | Farrar et al. | 128/2.05 P |
| 3,154,006 | 10/1964 | Grindheim et al. | 128/2.05 P |
| 2,837,082 | 6/1958 | Eliott et al. | 128/2.05 B |

*Primary Examiner*—William E. Kamm
*Attorney*—Jacox & Meckstroth

[57] ABSTRACT

Accelerometer transducer apparatus, of the type which is resistive, complete balanced bridge, unbonded strain gage, is positioned in engagement with the chest wall of a subject in the region of the heart. The accelerometer transducer has a primary response in a direction substantially normal to the chest of the subject. Sensing mechanism which senses frequencies in the range of between two and thirty cycles per second is connected to the accelerometer transducer, the signal output thus being a function of the precordial vibrations associated with the chest wall of the subject.

5 Claims, 3 Drawing Figures

APPARATUS OF THIS INVENTION

ELECTROCARDIOGRAPH

INVENTOR
HAROLD G. VIELHAUER

BY William R. Jacox
ATTORNEY

APPARATUS FOR PHYSIOLOGICAL INVESTIGATION

RELATED APPLICATION

This application is a continuation of my pending application, Ser. No. 586,117, filed Oct. 12, 1966, now abandoned.

BACKGROUND OF THE INVENTION

Various types of apparatus have been developed and used for physiological investigation. In the past, apparatus which has been used for investigation of heart action or blood pressure has required attachment of a portion of the apparatus to the subject being investigated or insertion of a portion of the apparatus into the subject. Of course, such requirements have been objectionable.

Furthermore, prior to this invention, satisfactory means for continuously monitoring or indicating or measuring blood pressure have not been available.

Also, most types of apparatus for cardiovascular investigation have been large and bulky and are thus objectionable.

An object of this invention is to provide apparatus which may be used in various types of physiological investigation, or determination, or observation, or the like.

Another object of this invention is to provide apparatus which is capable of continuously or instantaneously monitoring, measuring or indicating cardiovascular forces.

Another object of this invention is to provide apparatus which is capable of continuously or instantaneously monitoring, measuring, or indicating the blood pressure of a human subject or other animal.

Another object of this invention is to provide such apparatus which is capable of detecting exact forces in the cardiovascular system of a subject.

Another object of this invention is to provide such apparatus which may be used without attachment to the subject.

Another object of this invention is to provide such apparatus which may be used without the insertion of any portion thereof into the subject.

Another object of this invention is to provide such apparatus which can be very small in physical size and weight.

Another object of this invention is to provide such apparatus which may be used while the subject is moving, working, or performing certain types of activity.

Other objects and advantages reside in the construction of the invention, combinations thereof, the method of manufacture, and the mode of operation, as will become more apparent from the following description.

BRIEF DESCRIPTION OF THE DRAWING

Referring to the drawing in detail, apparatus of this invention comprises a transducer in the form of an accelerometer 10. The accelerometer 10 is positioned in engagement with a chest 12 of a subject, as shown in FIGS. 1 and 2. In FIG. 1 the chest 12 is shown as being substantially horizontal with the accelerometer 10 resting thereupon. In FIG. 2 the chest 12 is shown as being substantially vertical. Means (not shown) of any suitable type may be used, if desired or necessary, to retain the accelerometer 10 in the desired position in engagement with the chest 12.

Figure 1:
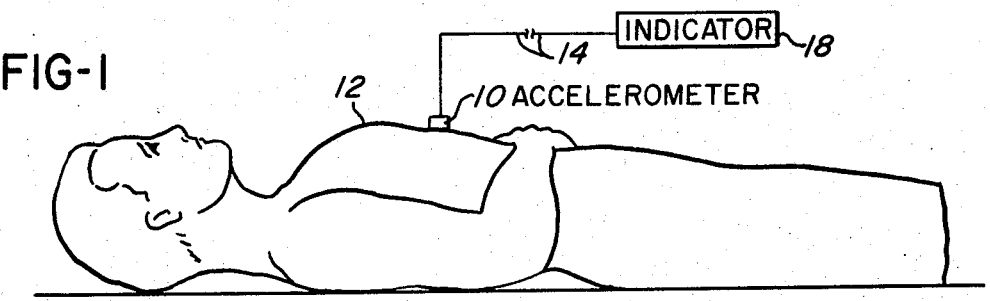
FIG. 1 is a diagrammatic type of view illustrating apparatus of this invention in use with a subject who is horizontally disposed.

The accelerometer 10 may be small in physical dimensions, in comparison to the dimensions of the chest 12. An accelerometer 10 which has been found to be satisfactory has physical dimensions less than two inches in length, less than one-half inch in width, and less than one-half inch in height. However, accelerometers of various other dimensions are also satisfactory.

The accelerometer 10 which has been found to be very satisfactory is one which has a weight of considerably less than 50 grams. The accelerometer 10 is one which is electrically energizable and/or which provides an output in the form of electrical signals.

Preferably, the accelerometer 10 has a rating of between 1 G and 6 G. That is, the accelerometer 10 may be one which is capable of producing satisfactory output signals when subjected to independent forces up to one times the force of gravity (1 G) or the accelerometer 10 may have a capacity greater than one times the force of gravity, but preferably, not in excess of 6 times the force of gravity (6 G). The accelerometer 10 is, preferably, one which has a primary response when moved in a direction substantially normal to the chest 12 with which the accelerometer 10 is in engagement.

Satisfactory results have been obtained with, for example, an accelerometer transducer identified as: 4 G Statham Accelerometer (F–4, 340, 11v maximum), (resistive, complete balanced bridge, unbonded strain gage). The accelerometer is directionally sensitive and its response to transverse acceleration is, preferably, not more than 0.02 G per G and its non-linearity and hysteresis are not more than plus or minus 1 percent of full scale.

The accelerometer 10 may be positioned in engagement with the chest wall at any portion thereof. However, preferably, to obtain maximum amplitude of signals produced, the accelerometer 10 is positioned in engagement with the chest 12 in the location of the apex beat of the heart.

The accelerometer 10 is connected by suitable electrical conductor means 14 to any suitable apparatus 18 which is capable of providing a graphical or an instantaneous reading. For example, the apparatus 18 may be a graphic recording device, or an oscilloscope, or an electric indicating instrument or the like or any other suitable apparatus, device or instrument.

Preferably, the apparatus 18 is one which senses only signals which have a frequency of between 2 to 30 cycles per second. Thus, the signals sensed are only those which are related to the mechanical activity of the heart. Therefore, other vibrations, such as chest sounds and respiration, which normally occur at frequencies which are not within the range of 2 to 30 cycles have insignificant effect upon the signals sensed by the apparatus 18.

The accelerometer 10 is capable of producing a signal which is a function of the acceleration forces to which it is subjected. Thus, the signal transmitted to the apparatus 18 which is indicated or recorded thereby is known to be the result of accelerations of the wall of the chest 12. These signals which are a result of acceleration forces can be amplified, if desired, and may be quantitated in the apparatus 18.

The accelerometer 10 is capable of providing a signal or signals which are a function of the precordial vibrations of the subject. A wave form may be obtained which represents blood pressure conditions. Thus, the accelerometer 10 is capable of providing a signal or signals which are a function of the blood pressure of the subject.

Furthermore, the accelerometer 10 is capable of providing a signal or signals which are a function of the condition of the heart of the subject.

It has been found that the output signals of an accelerometer such as the accelerometer 10 have a direct relationship to signals obtained by the use of an electrocardiograph or a sphygmomanometer or an instrument which is inserted into the cardiovascular system or other instruments for determining cardiovascular or physiological conditions.

Figure 3:
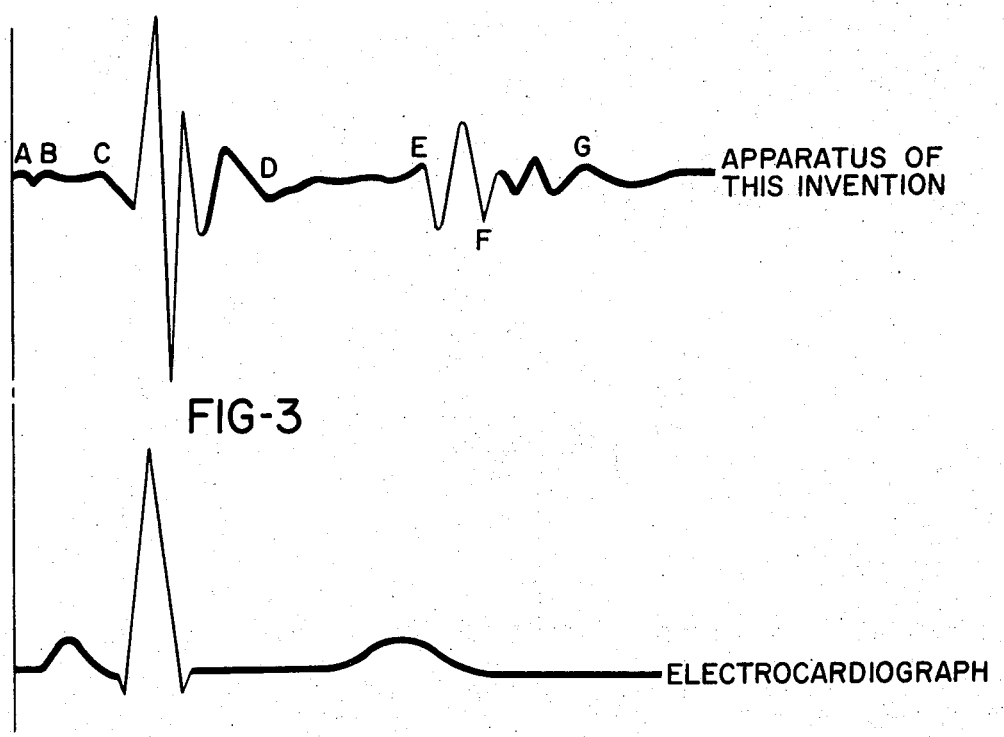
FIG. 3 shows a typical waveform obtained by the apparatus of this invention and a typical waveform obtained by an electrocardiograph, each waveform representing one heart beat of the subject.
Figure 2:
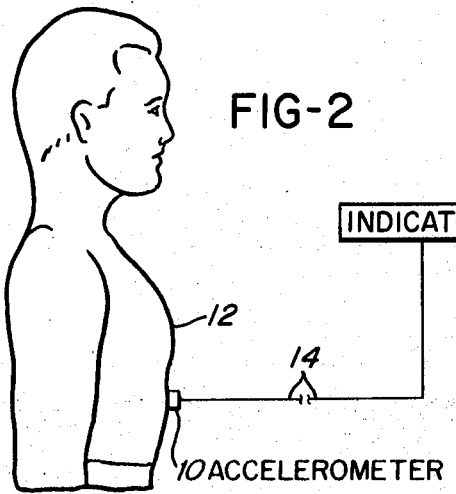
FIG. 2 is a diagrammatic type of view illustrating apparatus of this invention in use with a subject, the upper portion of whom is vertically disposed and who may be performing certain types of activity.

FIG. 3 shows a typical waveform obtained by the apparatus of this invention and a typical waveform obtained by an electrocardiograph, during one heart beat of the subject. The subject used in obtaining each waveform was a canine. However, similar comparison waveforms are obtained when the subject is a human. The electrocardiograph reveals primarily electrical activity of the heart, while apparatus of this invention reveals mechanical activity of the heart, i.e., muscular movement of the heart.

With regard to the waveform in FIG. 3 which was obtained by apparatus of this invention, the portion of the waveform referred to as AB is associated with the function of the atrium. The portion CD is associated with the function of the ventricle, and the portion EG is believed to be associated with the function of the aorta. The amplitude of the portion CD of the waveform is directly related to systolic blood pressure.

The accelerometer 10 thus may be employed as an instrument or device to provide signals which are directly related to blood pressure, heart condition, heart rate, or other cardiovascular conditions, or respiration rate, or other physiological conditions.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Apparatus for providing signals which are a function of precordial vibrations, comprising an accelerometer transducer of the type which is resistive, complete balanced bridge, unbonded strain gage, the accelerometer transducer being directionally sensitive and having a reading of between one times the force of gravity and 6 times the force of gravity, the accelerometer transducer being adapted to engage a portion of the chest of a subject, the accelerometer transducer having a signal output and primary response in a direction substantially normal to a given axis of the accelerometer transducer, the accelerometer transducer adapted to be positioned in engagement with the said portion of the chest of the subject so that the accelerometer transducer moves in a direction substantially normal to said given axis thereof during heart action of the subject, means responsive to the signal output of the accelerometer transducer connected to the accelerometer transducer and sensing frequencies in the range of between 2 and 30 cycles per second, the signal output being a function of the precordial vibrations associated with the chest and being a function of the heart action of the subject.

2. The method of determining precordial vibrations of a subject, comprising positioning an accelerometer transducer in engagement with the chest wall of the subject in the region of the heart and determining the output of the accelerometer transducer, the accelerometer transducer being of the type known as resistive, complete balanced bridge, unbonded strain gage, the accelerometer transducer having a primary response which is a function of the movement thereof in a direction substantially normal to the chest wall with which the accelerometer transducer is in engagement, the accelerometer transducer producing an output signal which is within the range of between two and thirty cycles per second and which is thus a function of the heart action of the subject.

3. The method of obtaining signals which are the function of the blood pressure of a subject comprising positioning an accelerometer transducer in engagement with the chest wall of the subject adjacent the apex beat location, the accelerometer transducer being of the type known as resistive, complete balanced bridge, unbonded strain gage, there being movement of the chest wall in response to the heart action of the subject, sensing the signal output of the accelerometer transducer which is within the range of between 2 and 30 cycles per second and which thus is a function of the amplitude of said movement of the chest wall, the magnitude of movement of the chest wall at frequencies between 2 and 30 cycles per second being directly related to the systolic blood pressure of the subject.

4. Apparatus for physiological investigation of a subject comprising:
an accelerometer transducer adapted to engage a chest portion of the subject, the accelerometer transducer being of the resistive, complete balanced bridge, unbonded strain gage type, the accelerometer transducer having a primary response which is normal to a given axis thereof, the accelerometer transducer adapted to be positioned in engagement with a chest portion of a subject so that the accelerometer transducer moves in a direction substantially normal to said given axis thereof with movement of said chest portion of the subject during heart action of the subject, the accelerometer transducer producing an output signal which is a function of said movement, receiver means electrically connected to the accelerometer transducer and sensing signals in the frequency range of between 2 and 30 cycles per second, said receiver means thus functioning in accordance with the mechanical action of the heart of the subject to provide signals which are a function of the heart action of the subject.

5. The method of claim 2 in which the accelerometer transducer is positioned at the apex beat location of the chest wall of the subject.

* * * * *